S. G. JONES.
Harrow.

No. 165,736. Patented July 20, 1875.

WITNESSES:
Francis McArdle
A. F. Terry

INVENTOR:
Samuel G. Jones
BY
ATTORNEYS.

N. PETERS, PHOTO-LITHOGRAPHER, WASHINGTON, D. C.

UNITED STATES PATENT OFFICE.

SAMUEL G. JONES, OF MOWEAQUA, ILLINOIS, ASSIGNOR TO HIMSELF AND JAMES M. JACOBS, OF SAME PLACE.

IMPROVEMENT IN HARROWS.

Specification forming part of Letters Patent No. 165,736, dated July 20, 1875; application filed June 12, 1875.

*To all whom it may concern:*

Be it known that I, SAMUEL G. JONES, of Moweaqua, Shelby county, Illinois, have invented a new and Improved Adjustable Harrow, of which the following is a specification:

The invention will first be fully described, and then pointed out in the claim.

Figure 1:
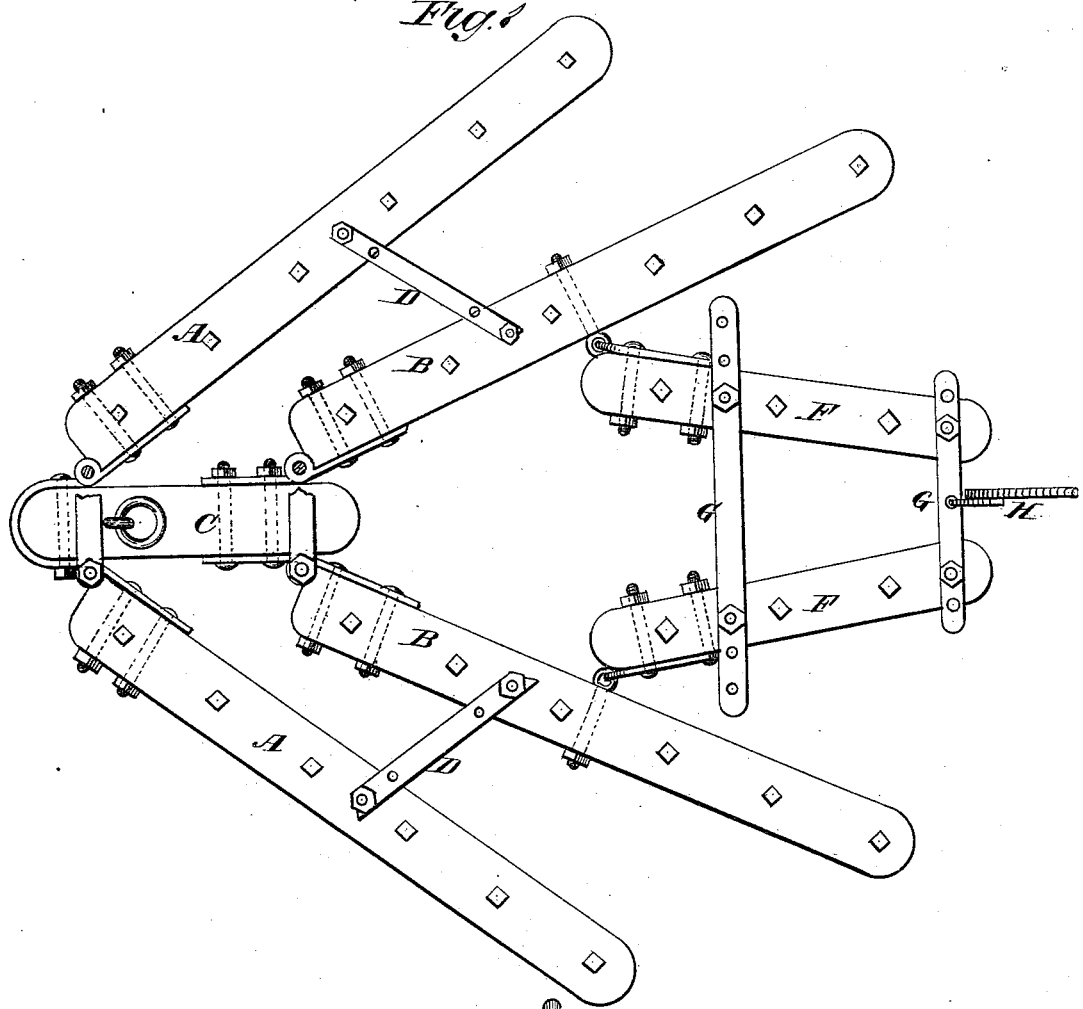
Figure 2:
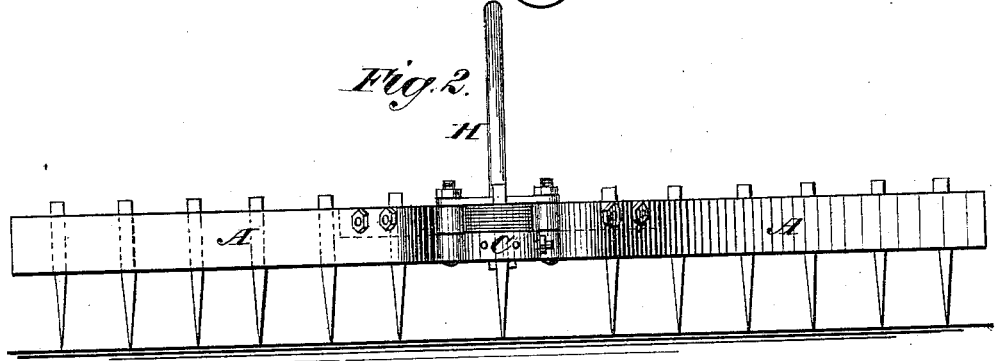

Figure 1 is a plan view, and Fig. 2 is a front elevation, of my improved harrow.

Similar letters of reference indicate corresponding parts.

A represents the side pieces of the forward frame, and B the side pieces of the hinder one. They are hinged to the center piece C, the former near the front end, and the latter near the hind end. The two side pieces of each side of these frames are connected by the bars D, which are jointed or pivoted, so that the side pieces may swing open or close, and they are contrived to connect the side pieces closer or wider apart, as may be required for different work. F represents the spreaders, being a couple of short pieces for carrying harrow-teeth, and hinged to the pieces B of the hinder frame, and connected by the adjustable cross-bars G, which are contrived to hold them more or less distant from each other, according to the desired width of the main frames. The hind cross-bar G has a handle, H, by which to guide it when running outside of the row for which the harrow is adapted by taking the teeth out of the piece C, to cultivate corn and other vegetables planted in rows. The spreader may be used with either one or both of the Λ-shaped frames, and it may be detached when the harrow is to be loaded or packed away to stow it in smaller space than it would otherwise take. The frames A B may be hinged together, instead of the center piece C, if preferred.

Having thus described my invention, I claim as new and desire to secure by Letters Patent—

The combination, in a harrow, of wings A B, spaced by bars D, with rearwardly-converging bars F F, spaced by bars G, as and for the purpose specified.

SAMUEL G. JONES.

Witnesses:
 GEO. M. KAISER,
 GEO. W. HALL.